United States Patent

Ota et al.

[11] Patent Number: 6,009,053
[45] Date of Patent: *Dec. 28, 1999

[54] OPTICAL DISK VIBRATION SENSING AND REPRODUCING DEVICE

[75] Inventors: Takumi Ota; Akihiro Kishishita; Kiyoshi Kodani; Masayuki Hayashida, all of Tottori, Japan

[73] Assignees: Tottori Sanyo Electric Co., Ltd., Tottori-ken, Japan; Sanyo Electric Co., Ltd., Osaka-fu, Japan

[ * ] Notice: This patent is subject to a terminal disclaimer.

[21] Appl. No.: 09/162,988

[22] Filed: Sep. 29, 1998

Related U.S. Application Data

[63] Continuation of application No. 08/855,252, May 13, 1997, Pat. No. 5,886,966.

[30] Foreign Application Priority Data

May 16, 1996 [JP] Japan ................................. 8-121797
Aug. 29, 1996 [JP] Japan ................................. 8-228571

[51] Int. Cl.$^6$ ................................. G11B 7/00; G11B 5/09
[52] U.S. Cl. ........................ 369/44.32; 369/50; 369/54
[58] Field of Search ........................... 369/32, 33, 47, 369/48, 50, 53, 54, 58, 44.27, 44.28, 44.29, 44.32; 360/73.03

[56] References Cited

U.S. PATENT DOCUMENTS

| | | |
|---|---|---|
| 4,530,018 | 7/1985 | Hoshipo et al. . |
| 4,750,059 | 6/1988 | Syracuse . |
| 5,636,193 | 6/1997 | Ohmi . |

FOREIGN PATENT DOCUMENTS 07182796  7/1995  Japan .

*Primary Examiner*—Paul W. Huber
*Attorney, Agent, or Firm*—Akin, Gump, Strauss, Hauer & Feld, L.L.P.

[57] ABSTRACT

In an optical disk reproducing device capable of rotating an optical disk at a selected one of a plurality of preset linear velocities, vibration or shock of the device is detected during rotation of the disk, and the linear velocity of the disk is determined based on the result of the detection of the vibration or shock to restrain the vibration and shock within a permissible range. A limit rotational velocity above which the vibration or shock is excessive may be determined during a test conducted each time a disk is inserted, and the linear velocity of the disk during reproduction may be determined such that the rotational velocity does not exceed the limit rotational velocity.

13 Claims, 3 Drawing Sheets

OPTICAL DISK VIBRATION SENSING AND REPRODUCING DEVICE

CROSS REFERENCE TO RELATED APPLICATION

This application is a continuation of application Ser. No. 08/855,252 filed May 13, 1997 entitled: "OPTICAL DISK VIBRATION SENSING AND REPRODUCING DEVICE". U.S. Pat. No. 5,886,966.

BACKGROUND OF THE INVENTION

The present invention relates to an optical disk reproducing device, and in particular an optical disk reproducing device which is capable of changing the linear velocity in accordance with the vibration of the device.

The linear velocity at which commercially available optical disk reproducing devices can operate is increasing year by year. In the case of CD-ROM drives for use with personal computers, the velocity is increasing from x1, to x2, x4, x6, and so on, and many of the CD-ROM drives are designed to operate at a selected one of a plurality of linear velocities.

The rotational velocity of the disk increases with the linear velocity. While the rotational velocity at the inner radial part is about 500 rpm with the standard velocity (x1 velocity), it is as high as 3000 rpm with the x6 velocity. With the increase in the velocity, vibrations increase and may become problematical. The increased vibrations may affect or disable the signal reading. The vibrations are caused by various factors such as eccentricity of the disk, variation in the position at which the disk is held, and unevenness in thickness of the disk. For instance, a commercially available CD-ROM disk with a nominal thickness of 1.2 mm has a thickness difference of 0.1 mm between the maximum and minimum thicknesses.

SUMMARY OF THE INVENTION

Accordingly, an object of the invention is to provide an optical disk reproducing device capable of operating at a maximum velocity while at the same time avoiding failure of reading.

According to the invention, there is provided an optical disk reproducing device comprising:

means for rotating an optical disk at a selected one of a plurality of linear velocities;

means for reading data from the disk while the disk is rotated;

means for detecting vibration or shock of the device during rotation of the disk; and a velocity control circuit for determining the linear velocity of the disk based on the result of the detection of the vibration or shock.

DETAILED DESCRIPTION OF THE PREFERRED EMBODIMENTS

Figure 1:
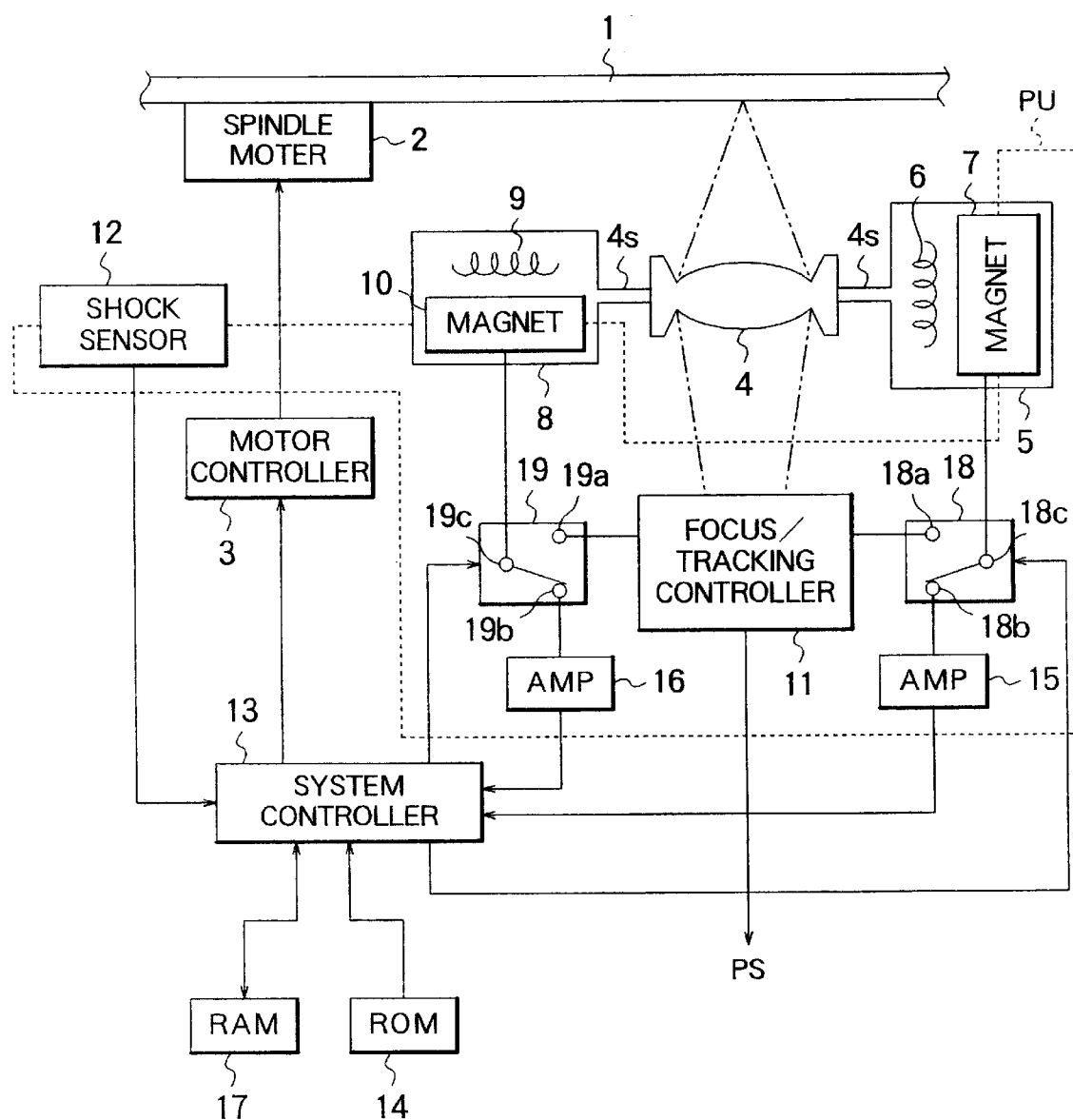
FIG. 1 is a block diagram showing a pertinent part of the CD-ROM disk reproducing device of an embodiment of the invention.

The preferred embodiments of the invention will now be described with reference to the drawings. FIG. 1 shows an embodiment of the invention.

The CD-ROM drive of this embodiment comprises a spindle motor 2 for rotating a CD-ROM disk 1. The CD-ROM disk 1 stores data representing characters, sound, images and the like along spiral tracks. At the innermost radial part of the disk is a TOC (table of contents) area, where addresses and the like of the respective pieces of data are stored. The above-mentioned data representing characters, sound, images and the like is stored in the data area which is outside of the TOC area.

An objective lens 4 converges the laser beam from a laser diode which is not shown, to form a beam spot on the surface of the disk, at which the data is read from the disk. The objective lens 4 also receives and directs the light reflected from the surface of the disk 1 to a focus/tracking controller 11.

A focusing unit 5 includes a focusing coil 6 and a focusing magnet 7. The lens 4 is supported by a lens support 4s. The focusing coil 6 is supported by the lens support 4s, and is thereby effectively fixed to the lens 4. The focusing magnet 7 is held by a pick-up frame schematically indicated by dotted line PU. The focusing coil 6 and the focusing magnet 7 cooperate to cause movement of the objective lens 4 toward and away from the disk surface, i.e., in the focusing direction, in response to a focusing control signal supplied from the focus/tracking controller 11.

A tracking unit 11 includes a tracking coil 9 and a tracking magnet 10. The tracking coil 9 is supported by the lens support 4s, and is thereby effectively fixed to the lens 4. The tracking magnet 10 is held by the pick-up frame PU. The lens support 4s is also supported by the pick-up frame PU such that the tracking coil 9 and the tracking magnet 10 cooperate to cause movement in the radial direction of the disk, i.e., in the tracking direction, in response to a tracking control signal supplied from the focus/tracking controller 11.

The focus/tracking controller 11 detects a focusing error and a tracking error based on the light reflected from the disk, and supplies the focusing control signal to the focusing unit 5 and the tracking control signal to the tracking unit 8. The focusing/tracking controller 11 also outputs a reproduced signal RS from the disk 1.

A motor controller 3 controls the rotational velocity of the spindle motor 2 in synchronism with the clock contained in the reproduced signal RS from the disk 1, supplied from the focus/tracking controller 11. The control over the rotation is for CLV (constant linear velocity), wherein the rotational velocity is lowered as the beam spot from the objective lens 4 moves radially outward on the disk (for scanning along the tracks) to maintain the linear velocity constant. The device is capable of operating in a selected one of a plurality of velocity modes, for respective velocities, namely, x1, x2, x4, x6 and x8 velocities, where x1 represents the standard velocity, and x2, x4, x6 and x8 respectively represent the twice, four times, six times and eight times the standard velocity. The rotational velocity varies over the following ranges for the respective velocity mode.

x1 530 to 200 rpm
x2 1060 to 400 rpm
x4 2120 to 800 rpm
x6 3180 to 1200 rpm
x8 4240 to 1600 rpm A feature of the embodiment is that the vibration and shock (represented by acceleration) are detected, and a limit rotational velocity above which the vibration or shock is excessive is determined, in a test mode of operation which is conducted immediately after and each time a disk is inserted.

In the reproduction mode of operation in which the data in the disk is reproduced, which is conducted after the test mode of operation, the linear velocity is controlled such that the rotational velocity does not exceed the limit rotational velocity. The linear velocity which can be selected is one of the discrete values (x1, x2, x4, . . . ), and the control is such that the linear velocity is switched to a higher value as the beam spot moves radially outwards and reaches a position at which the switching to the higher linear velocity does not cause the rotational velocity to exceed the limit rotational velocity.

To determine the limit rotational velocity above which the vibration or shock becomes excessive, an arrangement for detecting vibration and shock is provided.

In the embodiment under consideration, the vibration and shock are detected when the beam spot is at the innermost radial part, and the disk is rotated in each of the various linear velocities. If the vibration and shock for one linear velocity are not excessive, and the vibration or shock for the linear velocity higher by one step is excessive, the rotational velocity corresponding to said one linear velocity (with the beam spot being at the innermost radial part) is found to be the limit rotational velocity.

If the vibration and shock for the highest linear velocity (x8) are not excessive, then the rotational velocity corresponding to said highest linear velocity (with the beam spot being at the innermost radial part) is found to be the limit rotational velocity.

What follows is the description of the arrangement for detecting the vibration and shock.

An electromotive force is induced in the focusing coil 6, due to displacement between the focusing coil 6 and the focusing magnet 7, due to vibration. In this embodiment, this electromotive force is utilized for detecting the vibration.

Similarly, an electromotive force is induced in the tracking coil 9, due to displacement between the tracking coil 9 and the tracking magnet 10, due to vibration, and in this embodiment, this electromotive force is also utilized for detecting the vibration.

A shock sensor 17 is fixed to the pick-up frame PU, to detect an acceleration of the pick-up frame PU.

A system controller 13 comprises a microprocessor, and controls the various parts of the drive device in accordance with the programs stored in a ROM 14. Specifically, the system controller 13 specifies the linear velocity for the disk 1 based on the electromotive force generated in the focusing unit 5, and amplified by a focusing amplifier 15, the electromotive force generated in the tracking unit 8, and amplified by a tracking amplifier 16, and a detection signal from the shock sensor 12.

A RAM 17 stores data required for the operation of the system controller 13, such as data indicating the threshold value for the electromotive forces representing vibrations and acceleration representing shock above which the vibration or shock is found to be excessive, and the limit rotational velocity which should not be exceeded for preventing the vibration and shock from exceeding their threshold values.

A focusing switch 18 is controlled by the system controller 13 to selectively connect the focusing unit 5 with the focusing/tracking controller 11 to enable focusing control, or to the system controller 13 via the focusing amplifier 15 to enable detection of vibration.

A tracking switch 19 is controlled by the system controller 13 to selectively connect the tracking unit 8 with the focusing/tracking controller 11 to enable tracking control, or to the system controller 13 via the tracking amplifier 16 to enable detection of vibration.

Figure 2:
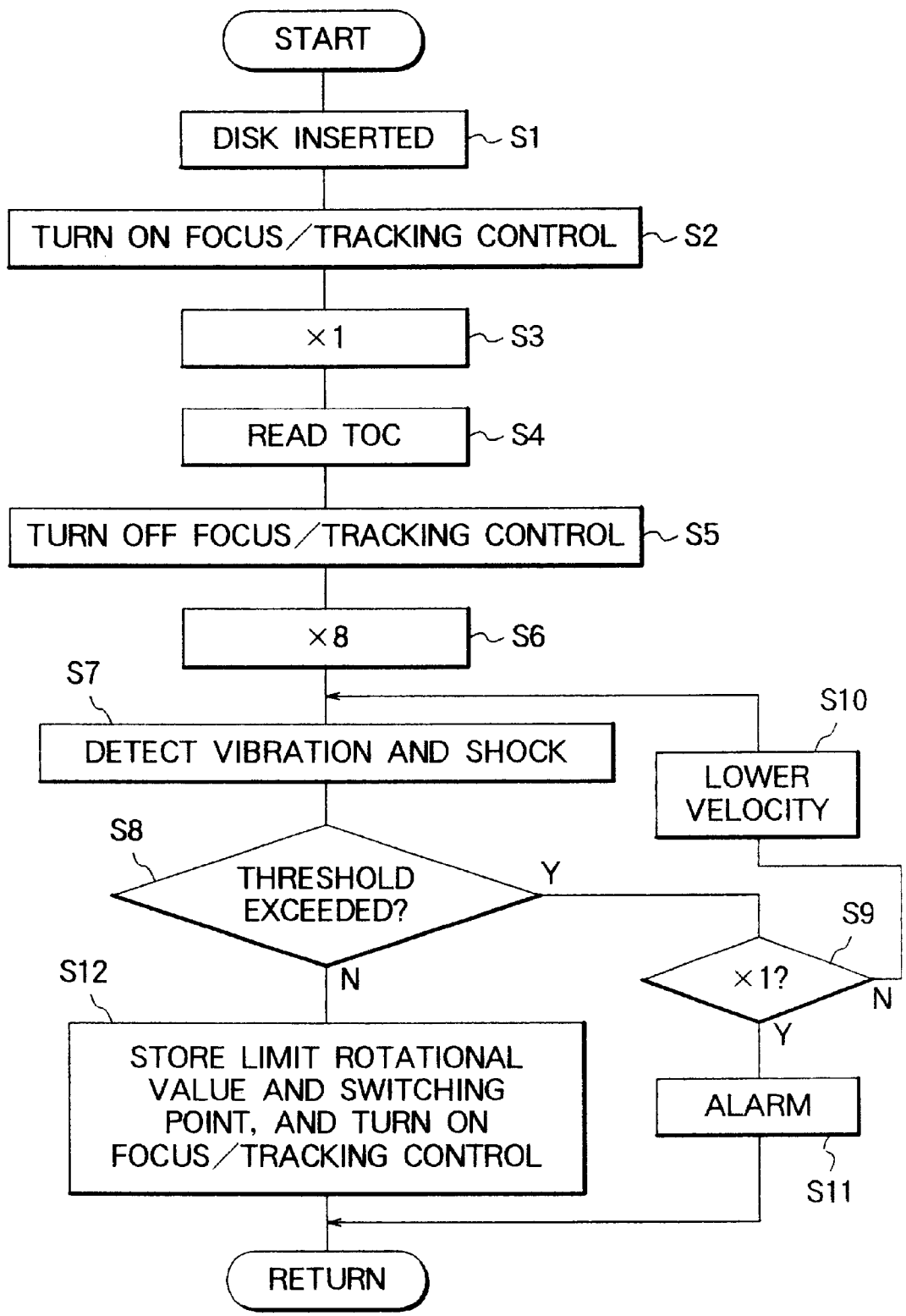
FIG. 2 and FIG. 3 are flowcharts showing the control operation.

FIG. 2 shows the operation of the system controller 13 performed according to the program stored in the ROM 14.

When it is detected that a disk 1 is inserted into the reproducing device (S1), the focusing switch 18 and the tracking switch 19 are turned to contacts 18a and 19a to connect the focus/tracking controller 11 to enable focus control and tracking control (S2).

The linear velocity is made to be the standard velocity, and the data in the TOC area is read (S3, S4). The data in the TOC area is important as initial data. Accordingly that the velocity is set to be the standard velocity, rather than x8 velocity.

Then, the focusing switch 18 is turned to contact 18b to connect to the focusing amplifier 15, and the tracking switch 19 is turned to contact 19b to connect to the tracking amplifier 16 (S5). The beam spot is maintained at the innermost radial part of the disk. The system controller 13 directs the motor controller 3 to increase the linear velocity of the disk 1 to the x8 velocity (S6). No control signals are therefore supplied to the focusing coil 6 and the tracking coil 9, and the electromotive forces due to vibration are supplied through the focusing amplifier 15 and the tracking amplifier 16 to the system controller 13, and information on the acceleration is also supplied from the shock sensor 12 to the system controller 13 (S7).

As was described, stored in the RAM 17 are threshold values for the electromotive force from the focusing amplifier 15, the electromotive force from the tracking amplifier 16, and the output from the shock sensor 12. If any of the threshold values are exceeded, it is judged that the threshold for vibration or shock is found to be exceeded (S8). Then, it is checked whether the disk linear velocity is at the standard velocity (x1), at step S9. If the disk is at the standard velocity, no further reduction is possible. The vibration or shock is excessive even at the standard velocity (S11), and the operation ends. If at the step S9, the velocity is not at the standard the velocity, then velocity is lowered (S10) by one step, e.g., from the x8 to x6, in other words, to a velocity one step lower than the velocity before the change. By the velocity reduction, vibration and shock are reduced.

After the velocity is reduced, then the vibration and the shock are again tested. If the vibration or shock still exceeds the threshold value, the velocity is again lowered by another step, from the x6 to x4 velocity. The velocity reduction is repeated step by step, from x4 to x2, and x2 to x1 (S7 to S10), until the vibration and shock are found to be smaller than the threshold values (S7 to S10).

When the vibration and shock are found non-excessive for the first time in the above sequence of operations. (Yes at S8), the rotational velocity at which the disk is rotated when the linear velocity is set, and the beam spot is at the innermost radial part is determined as the limit rotational velocity, and stored in the RAM 17 (S12).

At step S12, the radial position of the disk at which the linear velocity can be switched to a higher value by one step without causing the rotational velocity to exceed the limit rotational value is determined, and the address of the track or sector at the radial position is stored in the RAM 17.

For instance, if it has been found that the linear velocity which does not cause excessive vibration and shock while the beam spot is at the innermost radial part is x1, then the limit rotational velocity is 530 rpm. The radial position at which the rotational velocity is reduced to this limit rotational velocity is determined for other linear velocities. In this case, such a position can exist only for the linear velocity x2. The address of the track or sector at this radial position is then determined and stored in the RAM 17.

After the step S12, the focusing switch 18 and the tracking switch 19 are turned back to the contacts 18a and 19a, to connect the focus/tracking controller 11, to enable the focusing control and tracking control (S13).

The preceding discussion describes how the vibration and shock are detected each time the disk is inserted. During reproduction of data from the disk, the linear velocity is so controlled that the rotational velocity does not exceed the limit value.

Figure 3:
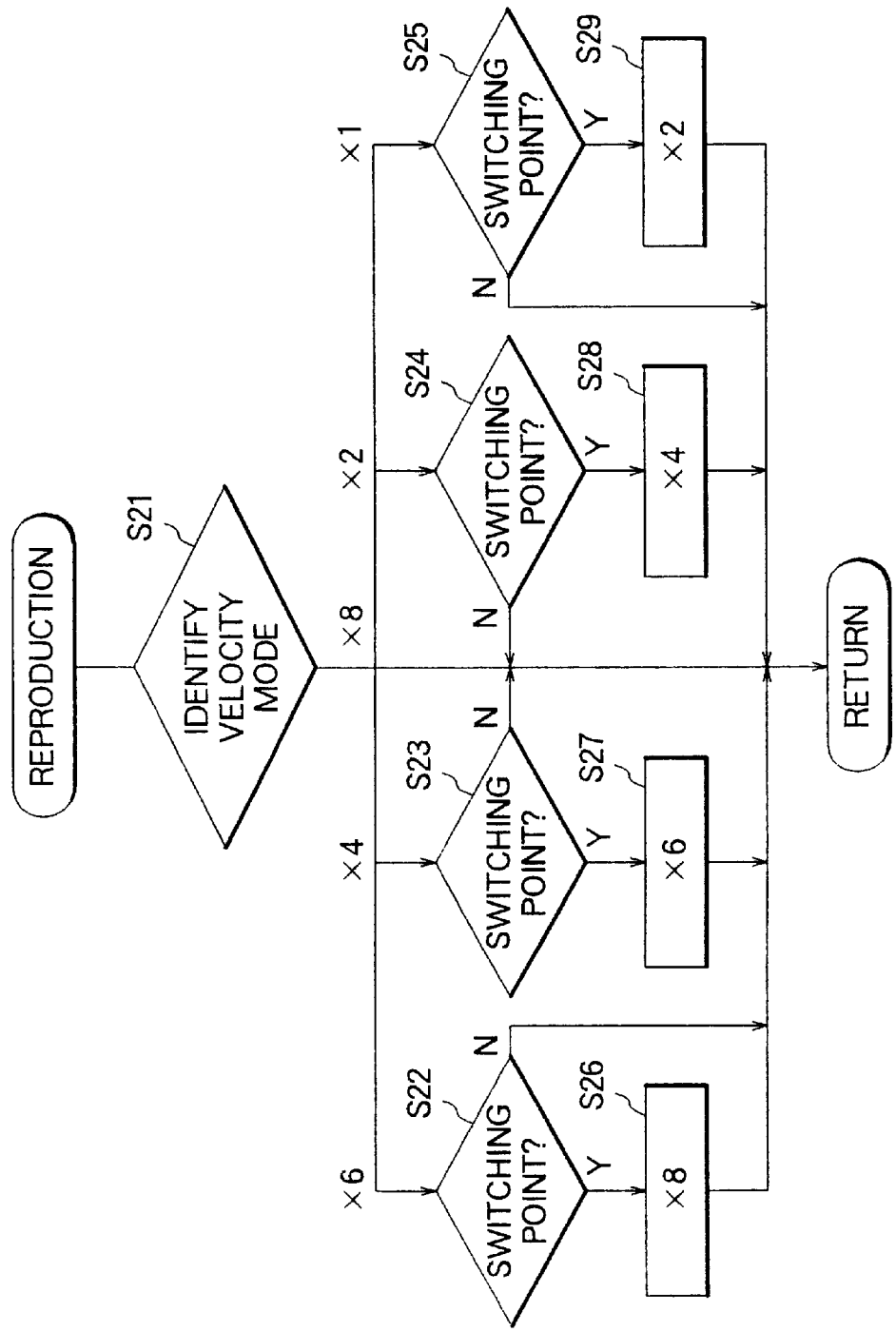

FIG. 3 is a flowchart showing the operation of the controller according to the program stored in the ROM 14, which is performed while the data on the disk is being reproduced, after the limit rotational velocity is set.

As was described above, the disk 1 is rotated with a constant linear velocity, so that the rotational velocity is gradually lowered as the beam spot moves radially outwards. For instance, the range of the variation of the rotational velocity for each of the standard and double velocities is as follows:
standard velocity (x1): 530 to 200 rpm
double velocity (x2): 1060 to 400 rpm
The maximum rotational velocity for the standard velocity is higher than the minimum rotational velocity for the double velocity, and therefore when the beam spot is radially more inward than a certain position (at which the rotational velocity is 530 rpm if the linear velocity is x2), the rotational velocity is below the maximum rotational velocity for the standard linear velocity. This is also true between the x4 velocity and the x2 velocity, between the x6 velocity and the x4 velocity, and between the x8 velocity and the x6 velocity.

The motor controller 3 has a capturing range of ±50%. If the rotational velocity is doubled, from 250 rpm to 500 rpm, for example, by transition from the standard linear velocity mode to the double linear velocity mode, the velocity before the switching is −50% with respect to the velocity after the switching, so that it is within the capturing range, and the data can be read without interruption.

As was mentioned, the address of the track or a sector at the position at which the linear velocity may be switched to a higher value without causing the rotational velocity to exceed the limit rotational velocity is stored in the RAM 17 for each linear velocity. During reproduction of data from the disk, when the beam spot reaches such a position, the linear velocity is increased by one step (S21 to S29), and the reading is continued. This enables the increase in the average velocity of the data reading, and also ensures correct data reading.

In the embodiment described, the focusing unit 5, the tracking unit 8, and the shock sensors 12 are used. It is not necessary to use all of these three. For instance, only one of them may be provided. However, if the vibration is detected based only on the electromotive force from the focusing unit 5 or the electromotive force from the tracking unit 8, the detection could be effected using different sensitivities and characteristics between the vibration in the direction normal to the surface of the disk and the vibration in the radial direction of the disk.

Detection of the vibration may be achieved by using other parts which for example already form part of the device.

In the embodiment described, the TOC area is scanned with the standard velocity, irrespective of the velocity for reading the data area. This however does not impose a limitation: the TOC area may also be scanned with the same velocity as the data area.

In the embodiment described, the limit rotational velocity is determined as the rotational velocity at which the disk is rotated when the beam spot is at the innermost radial part, and when the vibration and shock are found non-excessive for the first time while the linear velocity is decreased step by step.

The margin by which the vibration and shock are below their threshold values at the time when the vibration and shock are found to be non-excessive for the first time may be taken into consideration when determining the limit rotational velocity. For instance, if the vibration or shock (which is closer to its threshold) is found to be less than its threshold by a certain percentage M (e.g., M=20%) when the linear velocity is x1 and the beam spot is at the innermost radial part (so that the rotational velocity is 530 rpm), the limit rotational velocity is determined to be $$530/(1-M/100)=530/0.8=662.5 \text{ rpm}$$

In this case, the position at which the switching of the linear velocity to a higher value takes place is set to be the position at which the rotational velocity after the switching is 662.5 rpm.

In the example under consideration, the limit rotational velocity is set at the rotational velocity (e.g., 530 rpm) at which the disk is rotated when the beam spot is at the innermost radial part of the disk and the vibration and shock are found to be non-excessive for the first time. As an alternative or in addition, the rotational velocity (e.g., 500 rpm) a little smaller than the above-mentioned rotational velocity (530 rpm) may be stored (the secondary limit rotational velocity), and is used for the purpose of switching to a different linear velocity. This is to give an operational margin. For distinction from the "secondary limit rotational velocity", the limit velocity for the linear velocity x1, which is 530 rpm, is called a "primary limit rotational velocity".

That is, the system controller 13 permits the rotation at 530 rpm only at the linear velocity x1, and restricts the rotational velocity to 500 rpm at other linear velocities.

In the embodiment described, the beam spot is fixed at the innermost radial part of the disk, and the linear velocity is switched step by step, and the rotational velocity velocity is switched between discrete values. As an alternative, the rotational velocity may be changed continuously, or substantially continuously (independent of the rotational velocities at which the disk is rotated when the beam spot is at the innermost radial part and the linear velocity is at the respective discrete values x1, x2, x4, . . . ), and the maximum velocity at which the vibration and the shock do not exceed their threshold values found, and determined to be the limit rotational velocity.

To find such a maximum velocity, the rotational velocity may be gradually decreased from the highest velocity for the highest linear velocity, and the rotational velocity at which the vibration and shock are both found non-excessive for the first time may be determined as the maximum velocity and hence the limit rotational velocity. Alternatively, a binary search method may be used to find such a maximum velocity.

To find the maximum velocity through gradual decrease, the operation similar to that shown in FIG. 2 may be performed. However, at the step S10, where the linear velocity is lowered by one step (S10), the rotational velocity should be lowered by a certain unit amount.

In the embodiment described, the maximum linear velocity is x8. This however does not impose a limitation. The invention is applicable to an optical disk reproducing device capable of operating an even higher linear velocity.

What is claimed is:

1. An optical disk reproducing device comprising:

means of rotating an optical disk at a selected one of a plurality of linear velocities;

means for reading data from the disk while the disk is rotated;

means for detecting vibration or shock of the device during rotation of the disk;

a velocity control circuit for setting the linear velocity of the disk to be one of the plurality of linear velocities based on the result of the detection of the vibration or shock; wherein said velocity control circuit sets the linear velocity of the disk such that the rotational velocity does not exceed a rotational velocity limit.

2. The device according to claim 1, wherein said velocity control circuit causes the linear velocity to be one of the plurality of linear velocities; and while a beam spot for reading data from the disk is moving radially outwards, said velocity control circuit switches the linear velocity to a higher one of the linear velocities at a point where such switching does not result in the rotational velocity exceeding said rotational velocity limit.

3. The device according to claim 1, wherein said velocity control circuit detects the linear velocity at which the vibration or shock is excessive when the beam spot is at the innermost radial part of the disk, and finds a corresponding rotational velocity as a rotational velocity limit.

4. The device according to claim 1, wherein said velocity control circuit causes the rotational velocity to decrease gradually, and finds the rotational velocity at which the vibration or shock is not excessive for the first time as said rotational velocity limit.

5. The device according to claim 1, wherein said velocity control circuit performs the determination of said rotational velocity limit each time a disk is inserted.

6. The device according to claim 1, wherein said device selectively operates in a test mode and in a reproduction mode, said velocity control circuit performing the determination of the rotational velocity limit in said test mode, and performing the control over the linear velocity in the reproduction mode so that the rotational velocity does not exceed the rotational velocity limit.

7. The device according to claim 6, wherein when the rotational velocity limit is determined in said test mode, said velocity control circuit causes a memory to store an address of a track or a sector at a point where the linear velocity should be switched to a higher value while the beam spot is moving radially outwards, said point being at a position where such switching does not result in the rotational velocity exceeding said rotational velocity limit, and when the beam spot reaches said point in the reproduction mode said velocity control circuit causes the switching of the linear velocity.

8. The device according to claim 1, further comprising:

a lens for converging the laser beam illuminating the disk; and tracking means for detecting a tracking error and moving the lens in the radial direction of the disk;

wherein said detecting means detects the vibration responsive to operation of the tracking means.

9. The device according to claim 8, wherein said tracking means detects the tracking error based on light reflected from the disk.

10. The device according to claim 8, wherein said detecting means detects the vibration based on the electromotive force generated in the tracking means.

11. An optical disk reproducing device comprising:

means for rotating an optical disk at a selected one of a plurality of linear velocities;

means for reading data from the disk while the disk is rotated;

means for detecting vibration or shock of the device during rotation of the disk;

a velocity control circuit for setting the linear velocity of the disk to be one of the plurality of linear velocities based on the result of the detection of the vibration or shock;

a lens for converging the laser beam illuminating the disk; and tracking means for detecting a tracking error and moving the lens in the radial direction of the disk;

wherein said detecting means detects the vibration responsive to operation at the tracking means.

12. The device according to claim 11, wherein said tracking means detects the tracking error based on light reflected from the disk.

13. The device according to claim 11, wherein said detecting means detects the vibration based on the electromotive force generated in the tracking means.

* * * * *